United States Patent
Springer

(10) Patent No.: US 6,532,731 B2
(45) Date of Patent: Mar. 18, 2003

(54) TURBOFAN ENGINE HAVING CENTRAL BYPASS DUCT AND PERIPHERAL CORE ENGINE

(75) Inventor: Gaylen Springer, P.O. Box 4256, Salem, OR (US) 97302

(73) Assignee: Gaylen Springer, Salem, OR (US)

( * ) Notice: Subject to any disclaimer, the term of this patent is extended or adjusted under 35 U.S.C. 154(b) by 0 days.

(21) Appl. No.: 09/888,984

(22) Filed: Jun. 22, 2001

(65) Prior Publication Data

US 2002/0194834 A1 Dec. 26, 2002

(51) Int. Cl.⁷ .................................................. F02K 3/02
(52) U.S. Cl. ........................ 60/226.1; 60/262; 415/228
(58) Field of Search ............................ 60/226.1, 226.2; 415/199.4, 199.5, 228; 416/189

(56) References Cited

U.S. PATENT DOCUMENTS 4,175,384 A * 11/1979 Wagenknecht et al. ... 60/266 B
5,809,772 A * 9/1998 Giffin, III et al.
6,216,982 B1 * 4/2001 Pfennig et al. ............. 244/130

* cited by examiner

Primary Examiner—Charles G. Freay
Assistant Examiner—John F. Belena
(74) Attorney, Agent, or Firm—Chernoff, Vilhauer, McClung & Stenzel, LLP

(57) ABSTRACT

A turbofan engine has a fan bypass duct which is at the center of the engine surrounding the fan and compressor drive shafts and an annular drive engine which is located at the outer periphery of the engine surrounding the bypass duct. The annular drive engine includes an annular shell which has the compressor and turbine mounted on it. The bypass fan is rotatably mounted on a central shaft and the shell is attached to the tips of the fan blades. Thus, the fan and shell rotate together. Because the bypass duct is located at the center of the engine, the fan and compressor drive shafts are not heated by the core engine and remain at approximately ambient temperature.

12 Claims, 2 Drawing Sheets

TURBOFAN ENGINE HAVING CENTRAL BYPASS DUCT AND PERIPHERAL CORE ENGINE

BACKGROUND AND SUMMARY OF THE INVENTION

A turbofan engine has at its core a turbojet drive engine, which, in addition to providing thrust, powers a large bypass fan that is located in front of the core engine. The bypass fan compresses air and passes it through a bypass duct which surrounds the core drive engine. The air compressed by the bypass fan exits the bypass duct to create additional thrust. For large thrust engines a turbofan is much more efficient than a turbojet engine. The bypass fan is driven by a turbine located at the exit of the core drive engine through a drive shaft which extends through substantially the full length of the core drive engine along its longitudinal center line. In addition, the core drive engine has a compressor at its inlet which is driven by another turbine located at the exit of the core drive engine through another drive shaft which extends through substantially the full length of the core drive engine along its longitudinal center line. Since these shafts are buried in the center of a turbojet engine, they become quite hot, which requires them to have expensive bearing systems and possibly even a cooling system of some type. This adds considerably to the cost of the engine.

In addition, a bypass fan has a large diameter which makes turning it with a starter motor difficult. Thus, the bypass fan often is disconnected from the core drive engine during start-up. This also adds to the cost and complexity of the engine. It also is necessary to place the starter motor at the front of the engine so that it is not subjected to the high temperature created by the core drive engine.

Finally, large conventional turbofan engines have large diameter fans. Due to the fact that fan tip speed must remain in the subsonic range the fan must rotate at a lower speed than the core drive engine. This requires gearing between the drive engine and the fan which further adds to the cost and complexity of the engine. In addition, it requires the use of high speed bearings for the fan. Moreover, the diameter of the fan is limited due to the problem of physically mounting the engine on an airplane. This, coupled with the fact that the larger the fan the larger the drive engine needs to be to power it, ultimately limits the bypass ratio that can be obtained.

The subject invention overcomes the foregoing shortcomings of the prior art turbofan engines by placing the bypass duct at the center of the engine and surrounding it with an annular drive engine.

In a preferred embodiment, this is accomplished by having an annular shell which carries the annular drive engine compressor and turbine. The outside of the annular drive engine is enclosed by an annular cover. A plurality of burner cans are located between the compressor and the turbine. The shell is attached to the tips of the blades of a bypass fan which is rotatably mounted on a central shaft. Thus, the shell, turbine, compressor and fan rotate together. Because the annular drive engine is not located at the center of the engine, the centrally mounted drive shafts are not heated by it and do not have to have complex bearings or cooling systems.

The foregoing and other objectives, features, and advantages of the invention will be more readily understood upon consideration of the following detailed description of the invention, taken in conjunction with the accompanying drawings.

DETAILED DESCRIPTION OF THE PREFERRED EMBODIMENT

Figure 1:
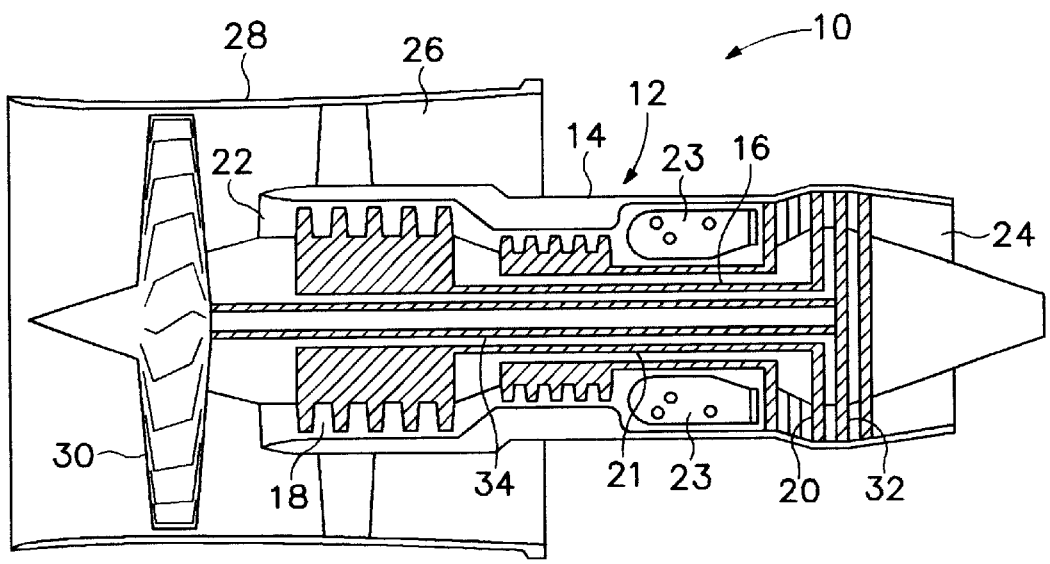
FIG. 1 is a sectional side elevation view showing a prior art turbofan engine.

Referring to FIG. 1 of the drawings, a typical prior art turbofan engine 10 has a core drive engine 12. The core drive engine includes a housing 14 and a shaft 16 which extends through the housing along its longitudinal center line. Mounted on the shaft 16 at the front of the core drive engine is an axial flow compressor 18. Mounted on the shaft 16 at the rear of the core drive engine is an axial flow turbine 20 which is connected to the compressor 18 through a shaft 21. A plurality of burner cans are located between the turbine and compressor.

In operation, air entering the inlet 22 of the core drive engine 12 is compressed by the rotating compressor 18 and the pressurized air flows around the burner cans 20. Fuel is ejected into the burner cans 20 and burned to heat and further pressurize the air. The pressurized air is then exhausted through the turbine 20 which causes the turbine to rotate. Since the compressor is mounted on the same shaft 21 as the turbine, it is rotated also. The pressurized air then exits the exhaust nozzle 24 of the core drive engine to provide thrust.

Surrounding the front end of the core drive engine is a bypass air duct 26 which is defined by an annular nacelle 28. Located in the bypass air duct 26 is a bypass fan 30 which is driven by a fan turbine 32, which is located at the rear of the core drive engine, through a fan shaft 34. The bypass fan acts as a precompressor for the air that enters the core drive engine inlet 22 and pressurizes a large volume of air which is exhausted from the outlet 36 of the bypass air duct to provide additional thrust.

Figure 2:
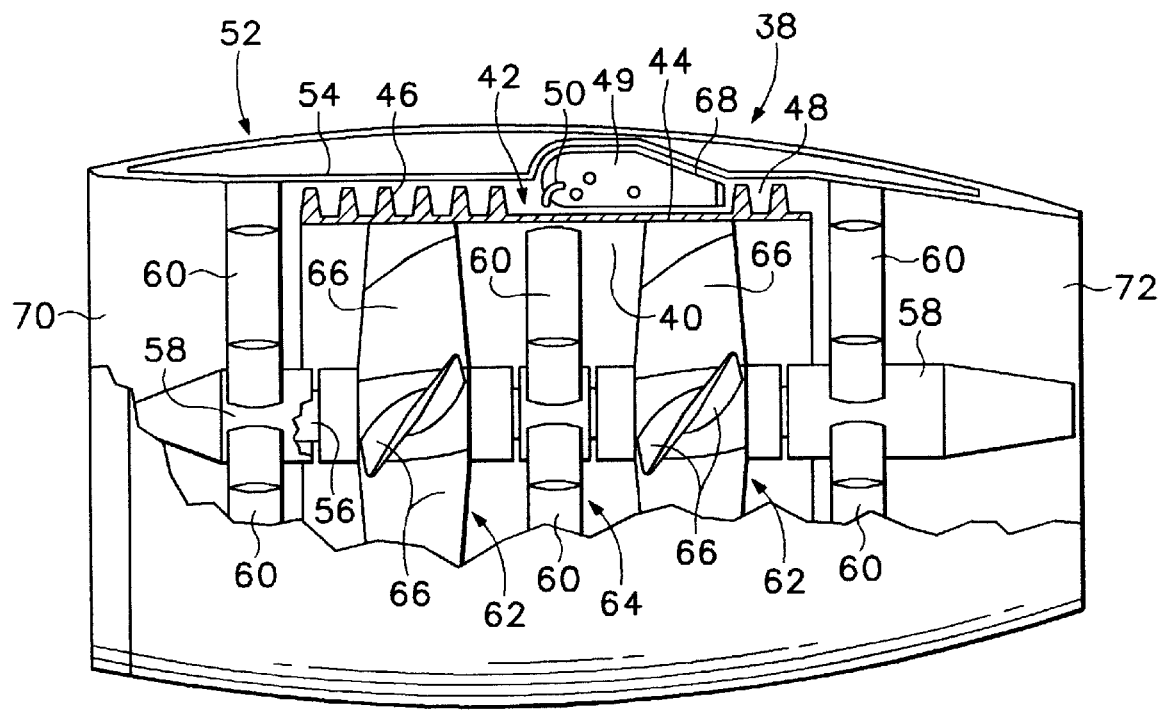
FIG. 2 is a sectional side elevation view showing a turbofan engine embodying the subject invention.

Referring now to FIG. 2 of the drawings, the subject turbofan engine 38 effectively reverses the location of the core drive engine and the bypass air duct. In this engine the bypass duct 40 is at the center of the engine 38 and an annular drive engine 42 surrounds the bypass duct. The core engine 42 includes an annular shell 44 which defines its inner periphery. Located at the front end of the shell is an axial flow compressor 46. The compressor shown has 6 stages, but it could be any size desired. Located at the rear end of the shell 44 is an axial flow turbine 48. In the embodiment illustrated the turbine has two stages, but it also could be any size desired. Located between the compressor and the turbine are a plurality of burner cans 49, which are not attached to the shell 44. The burner cans are of conventional design for engines of this type. Nozzles 50 spray fuel into the burner cans to power the engine. The entire engine is enclosed within a nacelle 52, and the inner wall 54 of the nacelle 52 defines the outer periphery of the annular drive engine.

Located at the center of the engine is a shaft 56. The front and rear ends of the shaft 56 are supported in hubs 58. A plurality of flow control vanes 60, whose purpose will be explained later, extends between the hubs 58 and the inner wall 54 of the nacelle to support the hubs. Rotatably mounted on the shaft 56 are one or more stages of a bypass fan 62. Irrotatably mounted on the shaft 56 are one or more guide vane sets 64. Each guide vane set includes several radially spaced-apart flow control vanes 60 which extend from the shaft 56 to the shell 44. In the embodiment illustrated in FIG. 2, there are two bypass fan stages with one guide vane set 64 but located between them. In order to facilitate placing the bypass fan stages and the guide vane sets on the shaft, the shaft probably will be split into multiple longitudinal sections, which is not shown in the drawings.

The tips of the individual fan blades 66 are attached to the inner wall of the shell 44. Thus the bypass fan 62 supports the shell. Furthermore, as the bypass fan 62 rotates, the shell, the turbine 48 and compressor 46 rotates with them. As mentioned above, the burner cans 49 are not attached to the shell and do not rotate with it. The burner cans are structurally supported by the nacelle 52, but are suspended from it to allow an air flow passageway 68 between the burner cans 49 and the wall 54 of the nacelle 52.

In operation the engine is started by using a starter motor, not shown, to rotate the bypass fan 62 and shell 44 much as it is done with a conventional turbofan engine. However, because the bypass fan has much smaller diameter fan blades than is the case with a conventional turbofan engine, it is not necessary to disconnect the bypass fan from the annular drive engine during start-up. In addition, the starter motor can be placed at either end of the engine. The rotating shells 44 causes the compressor 46 to draw air into the inlet 70 and compress it. The compressed air flows through and around the burner cans 49 where burning fuel in the cans increases the pressure of the air. The pressurized air then flows through the turbine 48 which maintains and increases the rotation of the shell 44. Finally, the pressurized air is expanded out of the engine nozzle 72 to provide thrust. In addition, the bypass fans draw additional air through the inlet 70 and into the bypass duct 40, pressurizes it and exhausts it out of the nozzle 72 to create bypass thrust. Since the shaft 56 is located in the center of the bypass duct 10, it is not heated by the burning fuel in the core engine and remains at essentially ambient temperature. The guide vanes 60 lessen the tendency of air flowing through the bypass duct from being caused to swirl due to the rotation of the shell 44.

Figure 3:
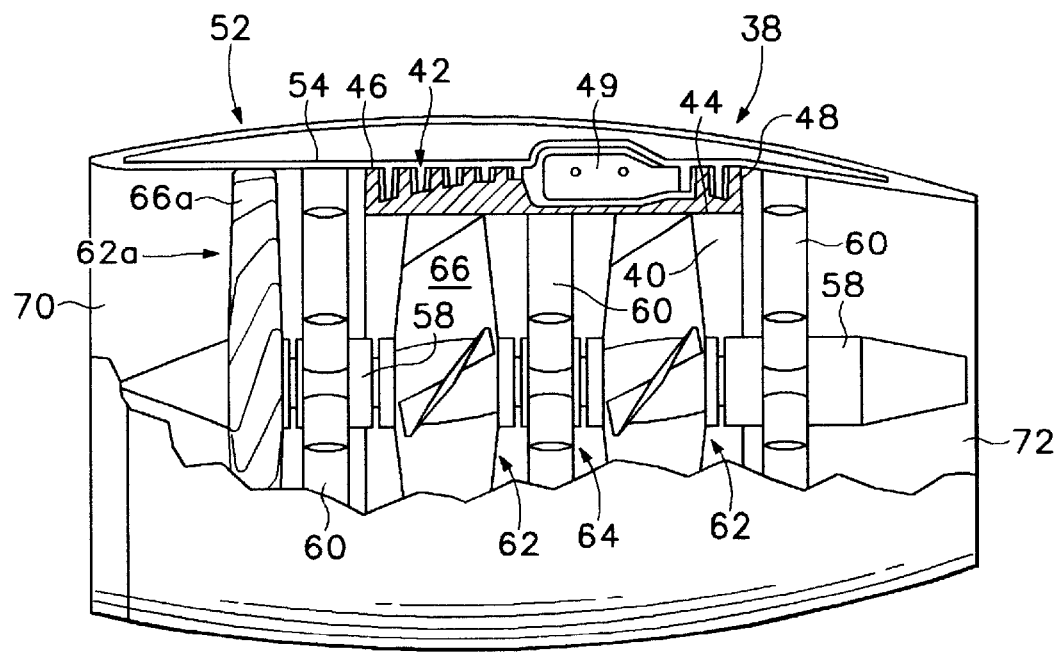
FIG. 3 is a sectional side elevational view showing another embodiment of the turbofan engine of the subject invention.

While the embodiment illustrated in FIG. 2 has all of the fan stages 62 located inside of and attached to the shell 44, one fan stage 62a, FIG. 3, can be located in front of the shell and to have blade 66a which extend outward to the nacelle inner wall 54. This fan stage then also serves as a precompressor for the annular drive engine.

Figure 4:
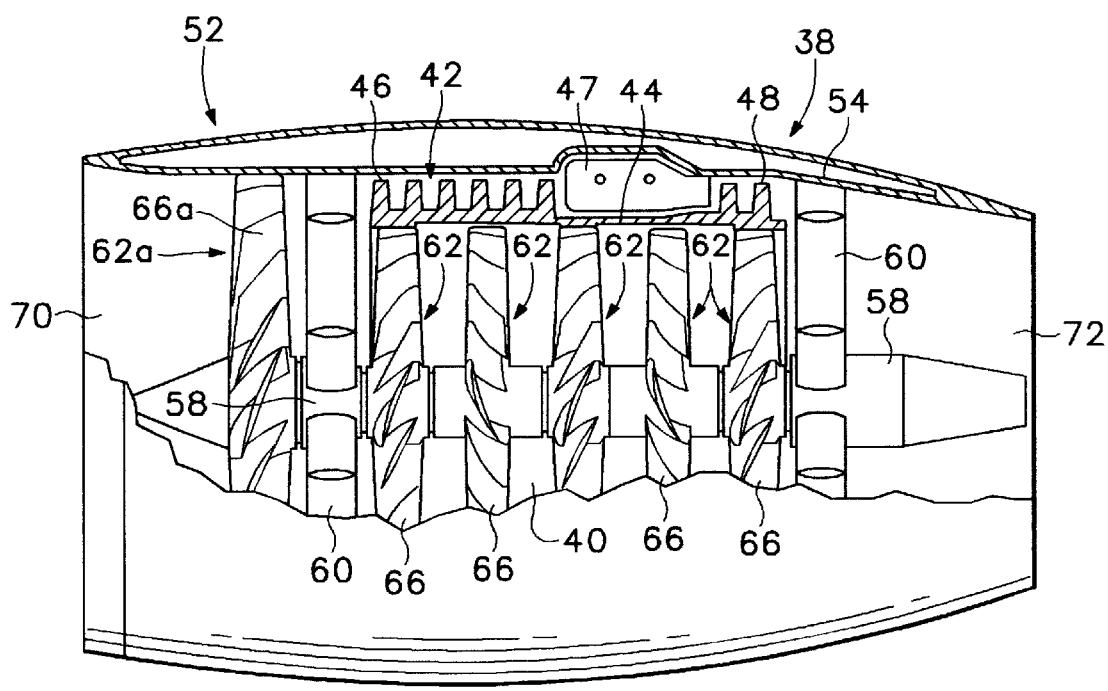
FIG. 4 is a sectional side elevation view showing yet another embodiment of the turbofan engine of the subject invention.

In addition, while the embodiment illustrated in FIG. 2 only has two bypass fan stages, the engine could have more stages, as shown in FIG. 4. This might require having less guide vane sets 64.

Because the fan is at the center of the engine it is not nearly as large as the fan in a conventional turbofan engine. This allows the fan to run at the same speed as the annular drive engine so gearing is not required between the fan and annular drive core engine, and high speed bearings are not required for the fan. In addition, placing the fan at the center of the engine permits having a larger bypass ratio than is possible with a conventional engine.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A turbofan engine comprising, an annular drive engine and a bypass air duct, which is focated inside of, said annular drive engine.

2. A turbofan engine comprising, an annular rive engine and a bypass duct having a bypass fan for pressurizing air passing through said bypass duct, said engine comprising said bypass duct being located at the center of said engine and said annular drive engine circumscribing said bypass duct.

3. The turbofan engine of claim 1 wherein said bypass fan is rotatably mounted on a fan shaft having a shaft axis that is coaxial with the horizontal center line of the engine, and said annular drive engine comprises:

(a) an annular shell which is rotatable about said shaft axis;
   (b) an axial flow compressor mounted on said shell and rotatable therewith proximate a forward end thereof;
   (c) an axial flow turbine mounted on said shell and rotatable therewith proximate a rearward end thereof;
   (d) at least one burner can located between said compressor and said turbine;
   (e) an annular cover which encloses the outer periphery of said annular drive engine.

4. The turbofan engine of claim 3 wherein said bypass fan includes a central hub which is rotatably mounted on said fan shaft, and vane tips which are attached to said shell so that said bypass fan and said shell rotate together about said shaft axis.

5. The turbofan engine of claim 4 wherein said bypass fan comprises multiple fan stages which are located at spaced-apart intervals along said fan shaft.

6. The turbofan engine of claim 5 wherein at least one of said fan stages is a precompression stage fan, which is located in the front of said shell, and does not rotate with said shell.

7. The turbofan engine of claim 6 wherein said precompression stage fan has blades which extend in front of said annular drive engine.

8. The turbofan engine of claim 7, including at least 1 set of guide blades which are irrotatably mounted on said shaft.

9. The turbofan engine of claim 8 wherein a set of said guide vanes is located between each stage of said bypass fan.

10. The turbofan engine of claim 8 wherein one set of guide vanes is located in front of said shell and extends in front of said annular drive engine.

11. The turbofan engine of claim 10 wherein one set of guide vanes is located behind said shell and extends behind said annular drive engine.

12. The turbofan engine of claim 11 wherein the sets of guide vanes which are located in front of and behind said shell have inner hubs which support said fan shaft, and guide vanes having tips which are connected to said annular cover.

* * * * *

UNITED STATES PATENT AND TRADEMARK OFFICE
CERTIFICATE OF CORRECTION

PATENT NO. : 6,532,731 B2
DATED : March 18, 2003
INVENTOR(S) : Springer, Gaylen

It is certified that error appears in the above-identified patent and that said Letters Patent is hereby corrected as shown below:

Column 2,
Line 54, "6" in "6 stages" should not be in bold print.

Column 3,
Line 41, delete "10" and insert -- 40 --
Line 61, delete "core" between "drive" and "engine."

Column 4,
Line 11, change "focated" to -- located --.
Line 13, change "rive" to -- drive --

Signed and Sealed this

Third Day of May, 2005

JON W. DUDAS
*Director of the United States Patent and Trademark Office*